(12) United States Patent
Tanabe et al.

(10) Patent No.: US 7,458,343 B2
(45) Date of Patent: Dec. 2, 2008

(54) ATMOSPHERIC POLLUTANT TREATMENT STRUCTURE

(75) Inventors: Kazuya Tanabe, Saitama (JP); Takashi Tsutsumizaki, Saitama (JP); Masaharu Nakamori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 615 days.

(21) Appl. No.: 10/688,927

(22) Filed: Oct. 21, 2003

(65) Prior Publication Data

US 2004/0139728 A1 Jul. 22, 2004

(30) Foreign Application Priority Data

Oct. 28, 2002 (JP) ............... 2002-312143

(51) Int. Cl.
*F01P 1/02* (2006.01)
*B01D 53/34* (2006.01)
*C01B 13/00* (2006.01)

(52) U.S. Cl. ............ 123/41.7; 123/41.69; 210/212

(58) Field of Classification Search ............ 123/41.69, 123/41.56, 41.7, 195 C, 198 E; 60/274; 423/212
See application file for complete search history.

(56) References Cited

U.S. PATENT DOCUMENTS

| | | | | | |
|---|---|---|---|---|---|
| 2,635,858 | A | * | 4/1953 | Keller | 165/69 |
| 2,680,601 | A | * | 6/1954 | Holben | 165/180 |
| 3,738,088 | A | * | 6/1973 | Colosimo | 96/26 |
| 3,937,192 | A | * | 2/1976 | Longhouse | 123/41.49 |
| 4,222,360 | A | * | 9/1980 | Fujikawa et al. | 123/195 C |
| 4,395,980 | A | * | 8/1983 | Tominaga et al. | 123/90.27 |
| 4,522,160 | A | * | 6/1985 | Speers et al. | 123/41.49 |
| 4,632,070 | A | * | 12/1986 | Onda et al. | 123/41.58 |
| 4,744,432 | A | * | 5/1988 | Shibata et al. | 180/68.1 |
| 5,423,660 | A | * | 6/1995 | Sortor | 416/189 |
| 5,997,831 | A | * | 12/1999 | Dettling et al. | 423/219 |
| 6,123,051 | A | * | 9/2000 | Kubina et al. | 123/41.49 |
| 6,142,113 | A | * | 11/2000 | Mochizuka et al. | 123/65 P |
| 6,189,492 | B1 | * | 2/2001 | Brown | 123/41.49 |
| 6,190,627 | B1 | * | 2/2001 | Hoke et al. | 423/219 |
| 6,200,542 | B1 | * | 3/2001 | Poles et al. | 423/210 |
| 6,212,882 | B1 | * | 4/2001 | Greger et al. | 60/274 |

(Continued)

FOREIGN PATENT DOCUMENTS

JP 10-512805 * 12/1998

(Continued)

OTHER PUBLICATIONS

"PremAir Ozone Destruction Technology Featured on New Volvo SUV." Engelhard Corp. Apr. 11, 2007. <http://www.engelhard.com/Lang1/xDocID7A6011F50F14EBB84D7DD0CD39BAB99/xDocTable_News/Tab_Overview/TechnologyClassID0/MarketID0/TechnologyID0/ApplicationID0/ProductID0/up1/SubSiteID0>. (p. 1).*

(Continued)

*Primary Examiner*—Stephen K. Cronin
*Assistant Examiner*—Ka Chun Leung
(74) *Attorney, Agent, or Firm*—Birch, Stewart, Kolasch & Birch, LLP

(57) ABSTRACT

To allow pollutants contained in atmospheric air to be treated effectively at all times during operation of a vehicle. A catalyst layer for treating atmospheric pollutants is formed on at least a surface of cooling fins provided on a cylinder portion of an engine mounted on a vehicle.

15 Claims, 7 Drawing Sheets

U.S. PATENT DOCUMENTS

| | | | |
|---|---|---|---|
| 6,216,660 B1 * | 4/2001 | Ryu et al. | 123/196 W |
| 6,218,804 B1 * | 4/2001 | Toriyama et al. | 320/104 |
| 6,340,066 B1 * | 1/2002 | Dettling et al. | 180/54.1 |
| 6,375,902 B1 * | 4/2002 | Moini et al. | 423/219 |
| 6,485,780 B1 * | 11/2002 | Sangeeta et al. | 427/180 |
| 6,517,899 B1 * | 2/2003 | Hoke et al. | 427/207.1 |
| 6,555,079 B2 * | 4/2003 | Hoke et al. | 423/210 |
| 6,569,393 B1 * | 5/2003 | Hoke et al. | 423/219 |
| 6,595,744 B2 * | 7/2003 | Van Houten | 415/173.1 |
| 6,616,903 B2 * | 9/2003 | Poles et al. | 423/210 |
| 6,681,619 B2 * | 1/2004 | Alleving et al. | 73/118.1 |
| 6,692,551 B2 * | 2/2004 | Wernholm et al. | 95/146 |
| 6,818,254 B1 * | 11/2004 | Hoke et al. | 427/421.1 |
| 6,835,356 B2 * | 12/2004 | Okayama et al. | 422/177 |
| 6,863,984 B2 * | 3/2005 | Hoke et al. | 428/447 |
| 7,083,829 B2 * | 8/2006 | Hoke et al. | 427/421.1 |
| 2001/0021363 A1 * | 9/2001 | Poles et al. | 423/230 |
| 2001/0052410 A1 * | 12/2001 | Busch et al. | 165/109.1 |

FOREIGN PATENT DOCUMENTS

| | | | |
|---|---|---|---|
| JP | 2004-141820 | * | 5/2004 |
| WO | WO 96/22148 | * | 7/1996 |

OTHER PUBLICATIONS

"PremAir catalysts for automotive applications." Engelhard Corp. Apr. 11, 2007. <http://www.engelhard.com/Lang1/xDocID62FC411F73D34305BB28EAE449E5728C/xDocTable_Product/Tab_Overview/TechnologyClassID0/MarketID0/TechnologyID0/ApplicationID0/up1/SubSiteID0>. (p. 1).*

"Using pasenger cars to destroy ozone." Engelhard Corp. Apr. 11, 2007. <http://www.engelhard.com/Lang1/xDocID5161C3B9BEE74E67A686804F04BB746C/xDocTable_Application/Tab_Overview/TechnologyClassID0/MarketID0/ApplicationID5161C3B9BEE74E67A686804F04BB746C/Up1>. (p. 1).*

"PremAir catalyst now part of The Sharper Image's Ionic Breeze Air Purifiers." Engelhard Corp. Apr. 11, 2007. <http://www.engelhard.com/Lang1/xDocID1EF8CDE1FB754A8788E84A989F41EA6C/xDocTable_CaseStudy/Tab_Overview/TechnologyClassID0/MarketID0/TechnologyID0/ApplicationID0/ProductID0/up1/SubSiteID0>. (p. 1).*

"Injection Molding Design Guidelines." Engineering Fundamentals. Aug. 23, 2000. Internet Archive. Apr. 15, 2007. <http://web.archive.org/web/20000823192545/http://www.efunda.com/designstandards/plastic_design/plastic_intro.cfm>. (p. 1).*

"Plastic Injection Molding." eMachineShop.com Apr. 15, 2007. <http://www.emachineshop.com/molding_machines/injection_molding.htm>. (pp. 1-5).*

"MIM Design Guide." Kinetics. Apr. 15, 2007. <http://www.kinetics.com/guide/non_flash/t10.shtml>. (p. 1).*

"Case Study #2: What makes Nickies the latest step in the evolution of the aircooled cylinder?" LN Engineering LLC. Apr. 15, 2007. <http://www.Inengineering.com/type1.html>. (p. 1).*

* cited by examiner

27a(28a)    27(28)

27a(28a)    27(28)

ATMOSPHERIC POLLUTANT TREATMENT STRUCTURE

CROSS-REFERENCE TO RELATED APPLICATIONS

The present application claims priority under 35 USC 119 to Japanese Patent Application No. 2002-312143 filed on Oct. 28, 2002 the entire contents thereof are hereby incorporated by reference.

BACKGROUND OF THE INVENTION

1. Field of the Invention

The present invention relates to an atmospheric pollutant treatment structure enabling treatment of pollutants contained in atmospheric air during the operation of a vehicle.

2. Description of Background Art

A vehicle mounted with a water-cooled engine is known, in which a catalyst for treating pollutants contained in atmospheric air is coated on a radiator thereof as disclosed in Japanese Patent No. Hei 10-512805.

However, when the conventional pollutant treatment structure mentioned above is applied to a motorcycle or a similar vehicle, a surface of the radiator will have a better chance of being contaminated with water or mud as the vehicle operates. There is then a stronger likelihood that pollutant treatment effects by the catalyst will be degraded.

SUMMARY AND OBJECTS OF THE INVENTION

In view of the foregoing, it is the object of the present invention to provide an atmospheric pollutant treatment structure allowing the atmospheric pollutants to be effectively treated at all times.

To achieve the foregoing object, the present invention provides a catalyst layer for treating atmospheric pollutants that is formed on a surface of a cooling fin for air cooling provided at least in a cylinder portion of an engine mounted in the vehicle.

In accordance with an arrangement of the present invention, the cooling fin is formed so as to relatively enlarge an area of contact with air for an improved cooling effect and the catalyst layer is formed on this enlarged surface of the cooling fin. Therefore, even with a vehicle mounted with an air-cooled engine and thus having no radiator, the atmospheric pollutants can be effectively treated. In addition, there is little likelihood that the surface of the cooling fin will be contaminated with water or mud, thus offering outstanding treatment effects at all times.

An arrangement of the present invention provides part of an engine body including a cylinder portion that is covered with a shroud that forms a cooling air passage in a space defined by the engine body. The catalyst layer is formed on either an outer surface of a fan fixed to a crankshaft and disposed inside the cooling air passage or an inner surface of the shroud. This arrangement allows air that flows through the cooling air passage of a forced-air-cooled engine to be effectively in contact with an even wider area of the catalyst layer. As a result, it is possible to treat atmospheric pollutants even more effectively.

An arrangement of the present invention provides an air flow passage that is formed on a vehicle body cover of the vehicle. The arrangement further includes a catalyst layer for treating atmospheric pollutants that is formed on an inner surface of the vehicle body cover, facing the air flow passage.

According to the arrangement of the present invention, the catalyst layer can be disposed on a relatively wide area by making effective use of a dead space inside the vehicle body cover without changing the appearance of the vehicle body cover. This makes it possible to treat atmospheric pollutants effectively. In addition, there is little likelihood that the inner surface of the vehicle body cover will be contaminated with water or mud. This allows a good effect to be produced from the treatment at all times.

An arrangement of the present invention provides a catalyst layer for treating atmospheric pollutants that is disposed in an air cleaner mounted on the vehicle, in such a manner that the catalyst layer is in contact with air flowing through the air cleaner.

According to the arrangement of the present invention, the catalyst layer is forced into contact with the air flow by disposing the catalyst layer inside the air cleaner through which atmospheric air is drawn in. This allows the atmospheric pollutants to be effectively treated. In addition, there is little likelihood that the inside of the air cleaner will be contaminated with water or mud. This allows a good effect to be produced from the treatment at all times.

An arrangement of the present invention provides an air flow passage that is formed inside a transmission case that covers a belt type continuously variable transmission provided across an engine and a driving wheel mounted in the vehicle. The arrangement further includes a catalyst layer for treating atmospheric pollutants that is provided in the transmission case so as to face the air flow passage.

In accordance with the arrangement of the present invention, the catalyst layer may be disposed to cover a relatively wide area inside the transmission case formed relatively widely for covering the belt type continuously variable transmission. This makes for effective treatment of the atmospheric pollutants. In addition, there is little likelihood that the inside of the transmission case will be contaminated with water or mud. This allows for a good effect to be produced from the treatment at all times.

In addition, in the arrangement of the present invention the pollutants are ozone. Through this arrangement, it is possible to effectively treat ozone contained in the atmosphere and convert it to oxygen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will be explained with reference to the accompanying drawings.

Figure 1:
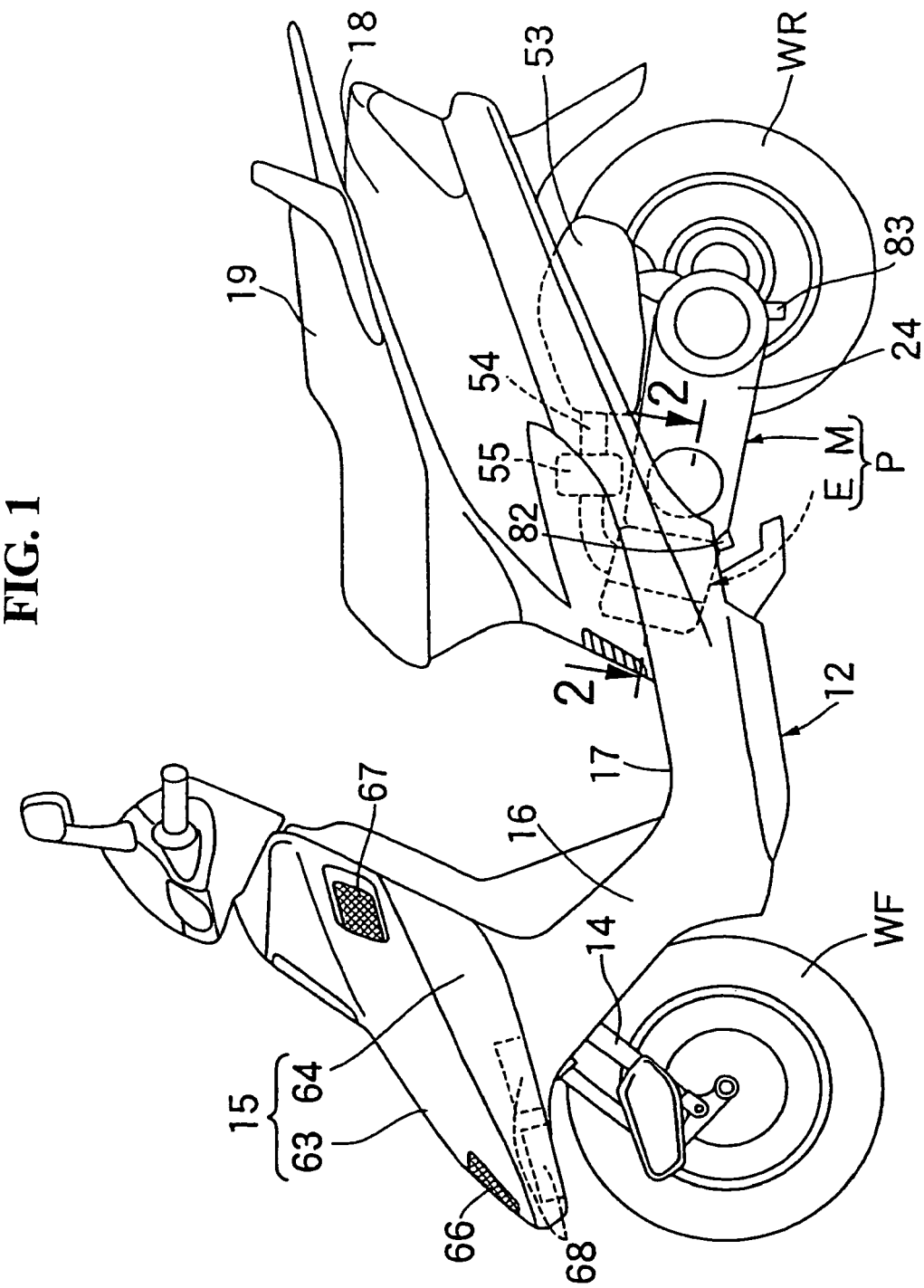
FIG. 1 is a side elevational view showing a scooter type motorcycle according to one preferred embodiment of the present invention.

Referring to FIG. 1, a body frame of the scooter type motorcycle supports a front fork 14 on a front end portion thereof so as to allow the front fork 14 to be steered. A front wheel WF is axially supported on a lower end portion of the front fork 14.

The body frame is covered with a body cover 12 made of a synthetic resin. The body cover 12 is composed of a front cover 15, a leg shield 16, a step floor 17, and a rear cover 18. The front cover 15 covers part of the front fork 14 and a front portion of the body frame. The leg shield 16 is continuously provided to each of both sides of the front cover 15. The step floor 17 is continuously provided to a lower end of the leg shields 16. The rear cover 18 covers a rear portion of the body frame. A tandem type driver/passenger seat 19 is disposed on the rear cover 18.

A front portion of a power unit P, which axially supports a rear wheel WR as a driving wheel on a rear end portion thereof and drives the rear wheel WR, is suspended vertically oscillatably.

The power unit P may include a forced-air-cooled engine E and a transmission gear M. The transmission gear M includes a belt type continuously variable transmission B (see FIG. 2) and transmits power from the engine E to the rear wheel WR through a gearshift. A transmission case 24 accommodating the transmission gear M is disposed on a left side sideways the rear wheel WR. The rear wheel WR is axially supported on a rear portion of the transmission case 24.

Figure 2:
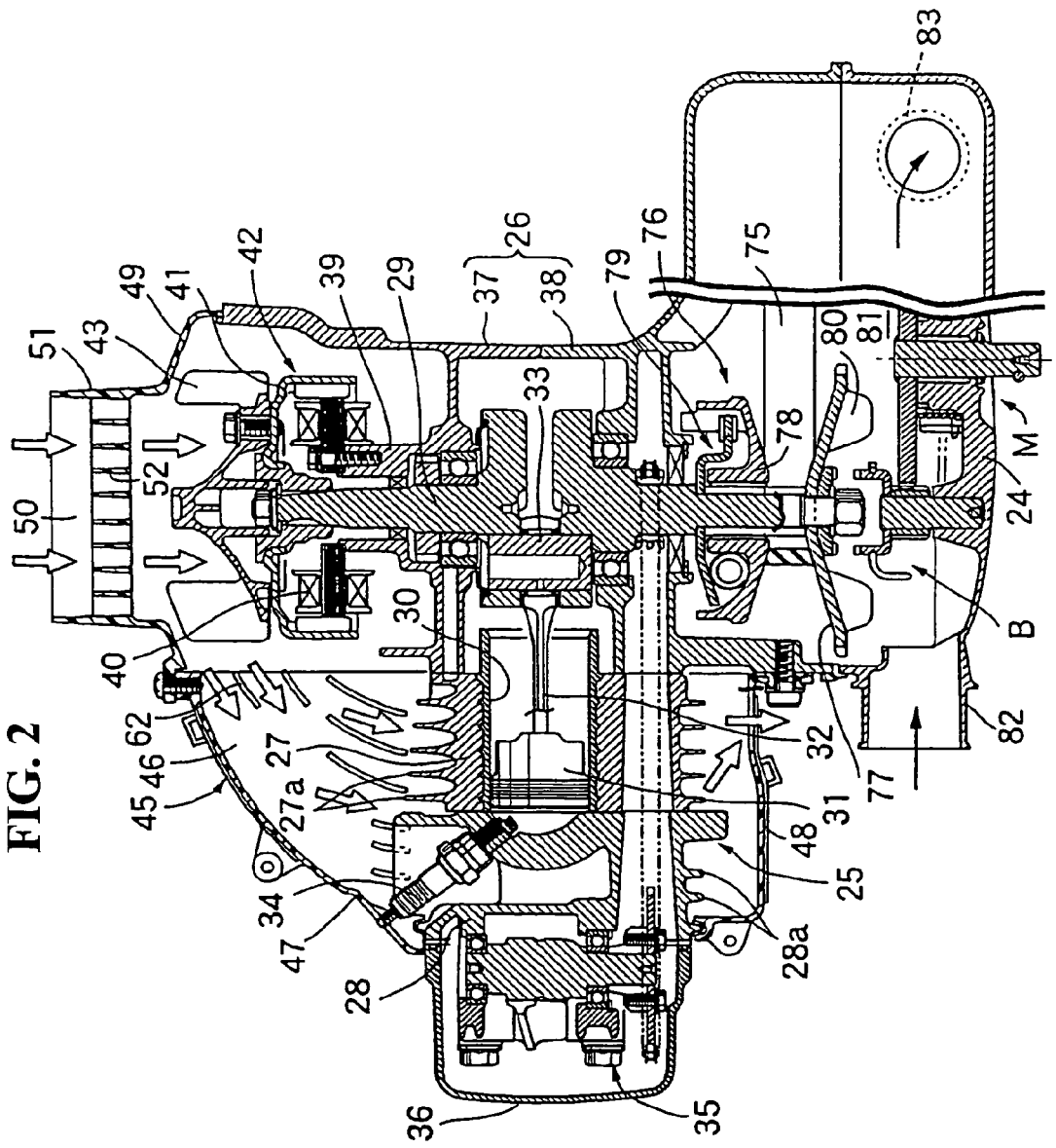
FIG. 2 is a cross sectional view showing a forced-air-cooled engine taken along a line 2-2 of FIG. 1.

Referring to FIG. 2, an engine main body 25 of the forced-air-cooled engine E is provided with a crankcase 26, a cylinder portion 27 connected in a forwardly inclined position to a front end of the crankcase 26, and a cylinder head 28 connected to a front end of the cylinder portion 27.

A crankshaft 29 having an axis extending in a crosswise direction is rotatably supported by the crankcase 26. A piston 31, slidably fitted into a cylinder bore 30 provided in the cylinder portion 27, is connected to the crankshaft 29 by way of a connecting rod 32 and a crankpin 33. Further, an ignition plug 34 is mounted on, and a valve mechanism 35 is disposed in, the cylinder head 28. A head cover 36 for covering the valve mechanism 35 is connected to a front end of the cylinder head 28.

A pair of case half bodies 37, 38 include a left-hand half and a right-hand half divided by a vertical plane defining an axis of the cylinder bore 30. The crankcase 26 is composed of the case half bodies 37, 38 connected to each other. A stator 40 is secured to a support cylinder 39 integrally provided in a protruding condition on one case half body 37. A rotor 41 making up a generator 42 in cooperation with the stator 40 is secured to one end portion of the crankshaft 29. In addition, a fan 43 is secured to this end portion of the crankshaft 29 by way of the rotor 41.

The cylinder portion 27 and the cylinder head 28, both forming part of the engine main body 25, are covered with a shroud 45. Air for forced air cooling discharged from the fan 43 flows through a cooling air passage 46 formed between the engine main body 25 and the shroud 45. To enable efficient cooling by means of the cooling air flowing through the cooling air passage 46, a plurality of cooling fins 27a, 28a are provided in a protruding condition on an outer surface of at least the cylinder portion 27, or the cylinder portion 27 and the cylinder head 28 in accordance with the embodiment, in the engine main body 25.

The shroud 45 is formed with a synthetic resin. The shroud 45 is provided with a pair of upper portion and lower portion cover members 47, 48 connected to each other so as to cover in cooperation with each other the cylinder portion 27 and the cylinder head 28. A fan cover 49 is provided for covering the case half body 37 of the crankcase 26 and is connected to the upper and lower portion cover members 47, 48.

The fan cover 49 is connected to the case half body 37 so as to cover the fan 43. A suction cylinder 51, in which a suction port 50 for drawing air in for the fan 43 from outside is formed and is provided in such a manner that the suction cylinder 51 corresponds to the fan 43 outwardly of the fan 43. The suction port 50 is provided with a louver 52.

The rear wheel WR is connected to the other end portion of the crankshaft 29 protruding from the other case half body 38 in the crankcase 26 by way of the transmission gear M including the belt type continuously variable transmission B.

Referring back to FIG. 1, an air cleaner 53 is disposed upwardly from the transmission gear M. The air cleaner 53 is connected to the cylinder head 28 of the engine E through an intake pipe 54 and a carburetor 55.

Figure 3:
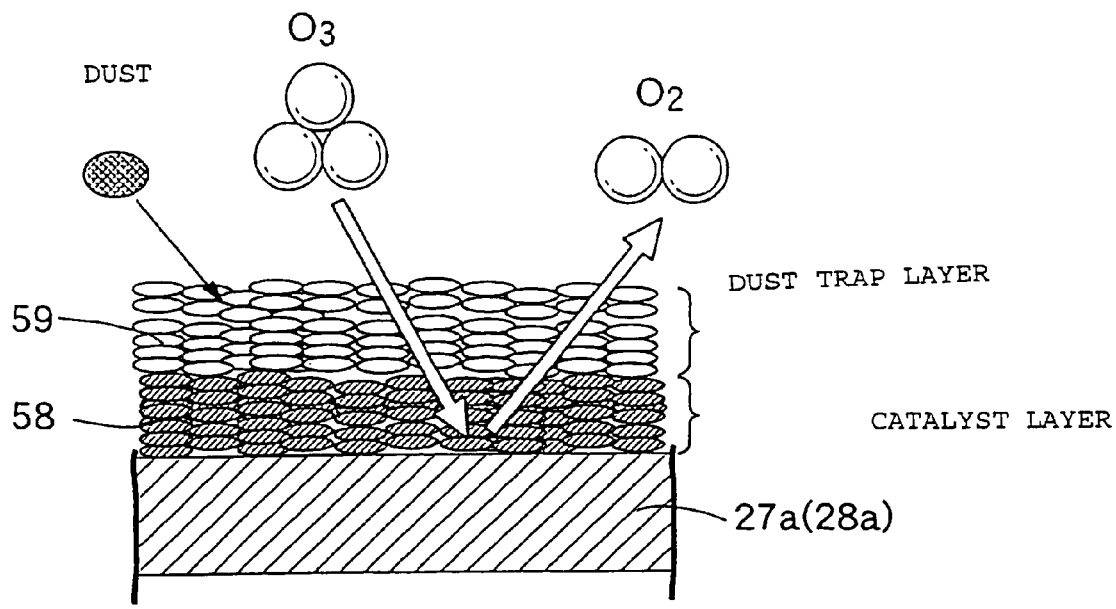
FIG. 3 is an enlarged cross sectional view showing a front surface of a cooling fin.

In the forced-air-cooled engine E of the scooter type motorcycle as described in the foregoing, the cooling fins 27a, 28a for air cooling are provided on at least the cylinder portion 27, or the cylinder portion 27 and the cylinder head 28 in accordance with this embodiment. A catalyst layer 58 for treating ozone as a pollutant in the atmospheric air is formed on a surface of the cooling fins 27a, 28a as shown in FIG. 3. Further, since the air flowing over the surface of the cooling fins 27a, 28a contains dust, a dust trap layer 59 is formed in such a manner that the dust trap layer 59 covers the catalyst layer 58 to prevent the dust from directly contacting the catalyst layer 58.

As a catalyst that forms the catalyst layer 58, one that processes ozone in the air to convert the ozone to oxygen, for example, a manganese compound containing an oxide, such as $Mn_2O_3$ and $MnO_2$, may preferably be used.

Figure 4:
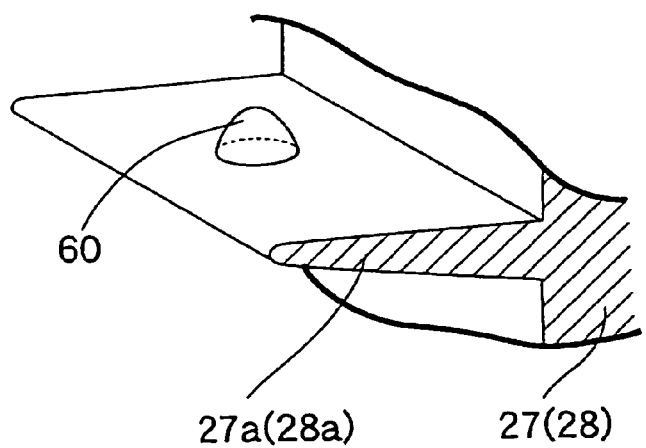
FIG. 4 is a fragmentary enlarged perspective view showing the cooling fin.

A plurality of protrusions 60 are integrally formed with the cooling fins 27a, 28a as shown in FIG. 4. The protrusions 60 produce turbulence in the air flowing near the cooling fins 27a, 28a, thereby enhancing an effect of treatment using the catalyst layer 58.

The cylinder portion 27 and the cylinder head 28 forming part of the engine main body 25 are covered with the shroud 45 that forms in a space formed with the cylinder portion 27 and the cylinder head 28 for the cooling air passage 46. The catalyst layer 58 is formed on at least either an outer surface of the fan 43 disposed in the cooling air passage 46 or an inner surface of the shroud 45. The catalyst layer 58 is covered with the dust trap layer 59 as shown in FIG. 3.

Figure 5:
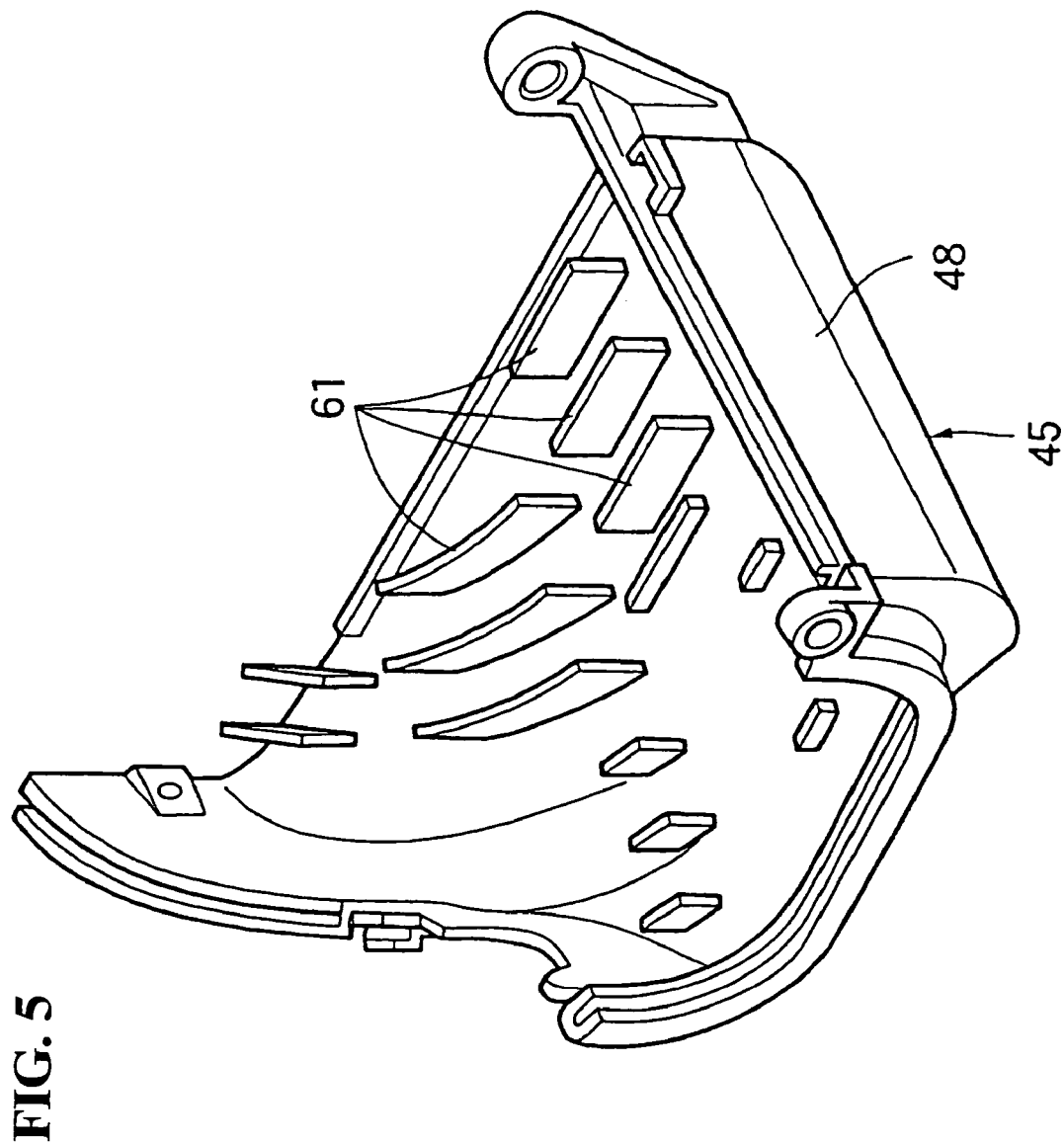
FIG. 5 is a perspective view showing a lower portion cover member forming part of a shroud.

If, in this case, the catalyst layer 58 is formed on the inner surface of the shroud 45, the following arrangements may be made. Specifically, a plurality of ribs 61 running along the flow of air flowing through the cooling air passage 46 are provided in a protruding condition on an inner surface of the lower portion cover member 48 that forms part of the shroud 45 as shown in FIG. 5. Similarly, a plurality of ribs 62 running along the flow of air flowing through the cooling air passage 46 are provided in a protruding condition on an inner surface of the upper portion cover member 49 that forms another part of the shroud 45 as shown in FIG. 2. These arrangements help increase the area of the catalyst layer 58 in contact with air, thus enhancing the treatment effects offered by the catalyst layer 58 without affecting a cooling performance offered by the engine E.

Figure 6:
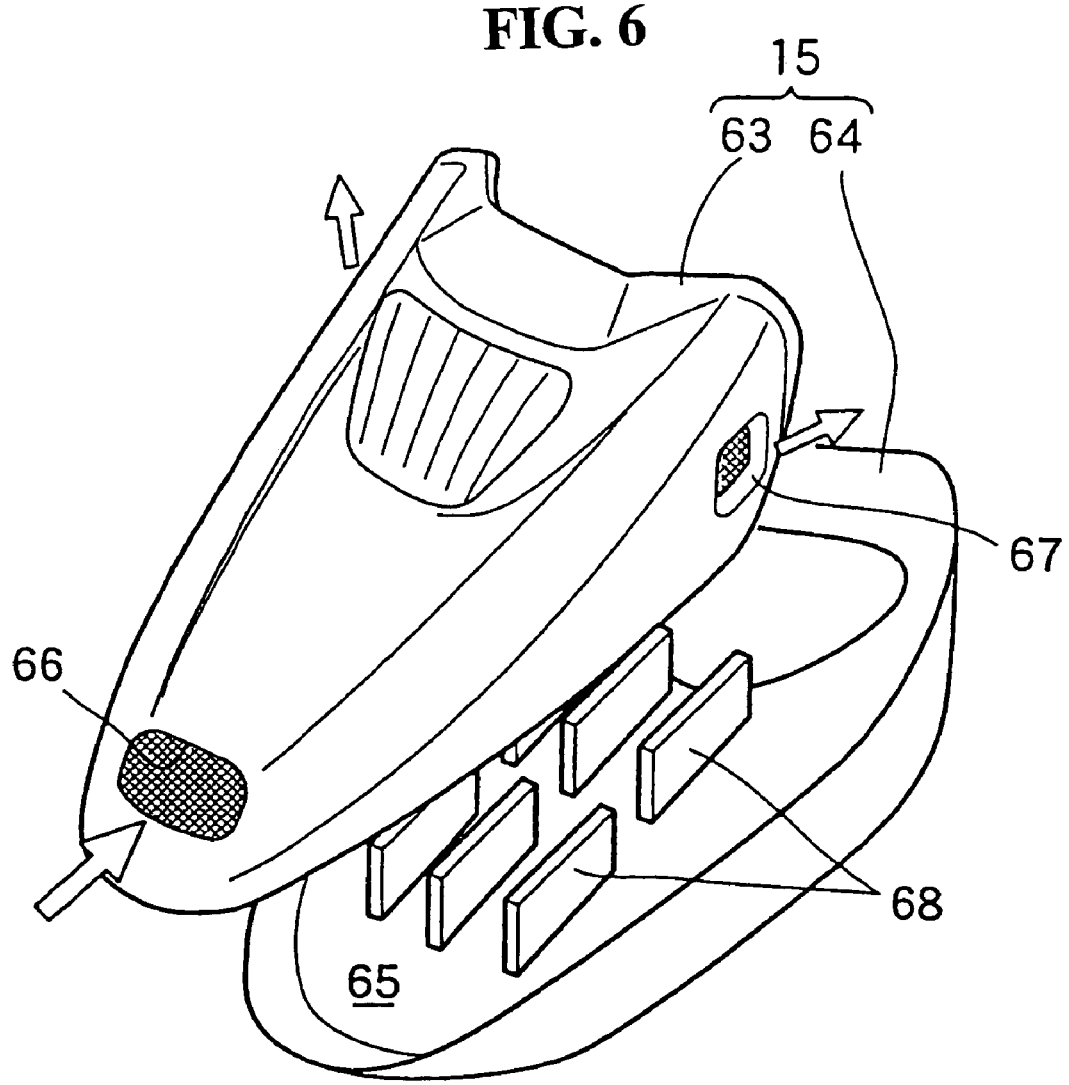
FIG. 6 is an exploded perspective view showing a front cover.

Referring to FIG. 6, the front cover 15 of the body cover 12 is composed of an upper portion cover half body 63 having a substantially U-shaped cross section opening downwardly and a lower portion cover half body 64 having a substantially U-shaped cross section opening upwardly. These two half bodies 63, 64 are connected together so as to form therebetween an air flow passage 65. There is formed at a front end portion of the upper portion cover half body 63 an inflow port 66 for allowing air into the air flow passage 65. Outlet ports 67 are provided for allowing the air to exit from the air flow passage 65 on both sides in a rear portion of the upper portion cover half body 63.

The catalyst layer 58 of the construction as shown in FIG. 3 is formed on an inner surface of the front cover 15. More specifically, on an inner surface of the upper portion cover half body 63 and on the lower portion cover half body 64. In addition, a plurality of ribs 68, 68 are provided on the inner surface of the lower portion cover half body 64 in a protruding fashion in such a manner that the ribs run along the flow of air flowing through the air flow passage 65. These arrangements help increase the area of the catalyst layer 58 in contact with air, thus enhancing the treatment effects offered by the catalyst layer 58.

A filter not shown may be filled in the inflow port 66. This eliminates the possibility of air containing dust from entering the air flow passage 65. This, in turn, eliminates the need of the dust trap layer 59 shown in FIG. 3, contributing to a reduced cost in ozone treatment.

Figure 7:
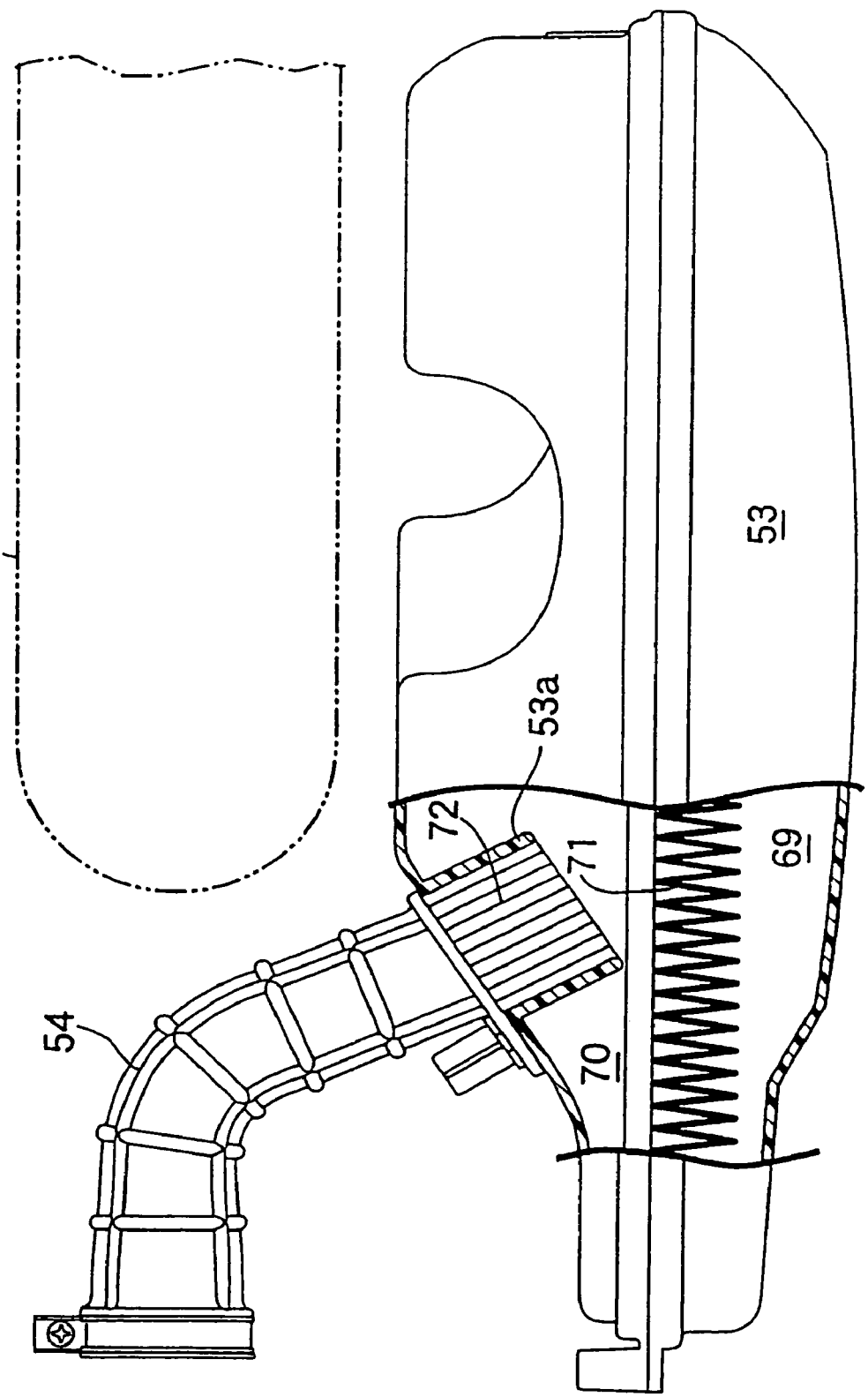
FIG. 7 is a fragmentary cutaway plan view showing an air cleaner and an intake pipe.

Referring to FIG. 7, an interior of the air cleaner 53 is divided into an unpurified air chamber 69 and a purified air chamber 70 by a filter element 71. The intake pipe 54 is connected to the air cleaner 53 so as to communicate with the purified air chamber 70. A connection cylinder portion 53a communicating with the intake pipe 54 is provided inside the purified air chamber 70 in the air cleaner 53. A catalytic carrier member 72 of a honeycomb shape is housed and secured in the connection cylinder portion 53a. The catalyst layer 58 is formed on a surface of the catalytic carrier member 72. Since the air flowing through the catalytic carrier member 72 has been purified by the filter element 71, there is no need of covering the catalyst layer 58 with the dust trap layer 59. This contributes to an even further reduced cost in ozone treatment.

Furthermore, referring to FIG. 2, the belt type continuously variable transmission B is mounted on an end portion of the crankshaft 29 and provided with a drive pulley 76 around which an endless V belt 75 is wound. The drive pulley 76 is composed of three components. These components are specifically: a fixed pulley half body 77 secured to the crankshaft 29; a movable pulley half body 78 slidably supported by the crankshaft 29 to be brought into proximity to, or away from, the fixed pulley half body 77; and, a centrifugal mechanism 79 exerting a force to push the movable pulley half body 78 toward the fixed pulley half body 77 in accordance with the increase in the rotational speed of the crankshaft 29.

A fan 80 is integrally formed with the fixed pulley half body 77. There is formed inside the transmission case 24 an air flow passage 81 for allowing air produced by the fan 80 rotating with the crankshaft 29 to pass therethrough. An air entrance pipe 82 for drawing air into the air flow passage 81 is provided at a front portion of the transmission case 24. Further, an air exit pipe 83 for exhausting air from the air flow passage 81 is provided in a rear portion of the transmission case 24.

The catalyst layer 58 is formed on the inner surface of the transmission case 24 so as to face the air flow passage 81. A filter not shown may be filled to the air entrance pipe 82. This eliminates the possibility of air containing dust entering the air flow passage 81. This, in turn, eliminates the need of the dust trap layer 59 shown in FIG. 3, achieving an even further reduced cost in ozone treatment.

The operation of this embodiment will be explained. The scooter type motorcycle is mounted with the engine E having the cooling fins 27a for air cooling, provided on at least the cylinder portion 27. According to this embodiment, the engine E having the cooling fins 27a, 28a for air cooling provided on the cylinder portion 27 and the cylinder head 28 is mounted in the scooter type motorcycle. The catalyst layer 58 for treating pollutants contained in the atmosphere is formed on each of the surfaces of the cooling fins 27a, 28a.

The cooling fins 27a, 28a are formed in such a manner that the fins offer a relatively large contact area with air in order to enhance a cooling effect. The catalyst layer 58 is formed on the surface of these cooling fins 27a, 28a. The ozone as an atmospheric pollutant can therefore be effectively treated even with the scooter type motorcycle that has no radiators for its air-cooled engine E. Moreover, there is little likelihood that the surface of the cooling fins 27a, 28a will be contaminated with water or mud, allowing the motorcycle to offer outstanding treatment effects at all times.

Part of the engine main body 25 is covered with the shroud 45 that forms the cooling air passage 46 with the engine main body 25. The catalyst layer 58 is formed on at least either the outer surface of the fan 43 fixed to the crankshaft 29 and disposed inside the cooling air passage 46 or the inner surface of the shroud 45. It is therefore possible to make the air flowing through the cooling air passage 46 of the forced-air-cooled engine E effectively in contact with an even wider area of the catalyst layer 58. This results in the ozone in the atmosphere being treated even more effectively.

The air flow passage 65 is formed in the front cover 15 of the body cover 12 and the catalyst layer 58 is formed on the inner surface of the front cover 15 so as to face the air flow passage 65. It is therefore possible to effectively treat atmospheric pollutants by making effective use of a dead space inside the body cover 12 and arranging the catalyst layer 58 to cover a relatively wide area, without changing the appearance of the body cover 12. In addition, there is little likelihood that the inner surface of the body cover 12 will be contaminated with water or mud. This leads to an outstanding treatment effect offered at all times.

The catalyst layer 58 is disposed so as to be exposed to air flow in the purified air chamber 70 of the air cleaner 53. This arrangement of the catalyst layer 58 disposed in the air cleaner 53 that draws in atmospheric air forces the catalyst layer 58 into contact with the air flow, thus allowing the atmospheric pollutants to be effectively treated. In addition, there is little likelihood that the inside of the air cleaner 53 will be contaminated with water or mud. This leads to an outstanding treatment effect offered at all times.

An air flow passage 81 is also formed in the transmission case 24 that covers the belt type continuously variable transmission B across the area from the engine E to the rear wheel WR. The catalyst layer 58 is provided in the transmission case 24 so as to face the air flow passage 81. The catalyst layer 58 can therefore be disposed to cover a relatively wide area inside the transmission case 24 formed relatively widely so as to cover the belt type continuously variable transmission B. The catalyst layer 58 is thus allowed to effectively treat atmospheric pollutants. There is also little likelihood that the inside of the transmission case 24 will be contaminated with water or mud. An outstanding treatment effect can therefore be achieved at all times.

Figure 8:
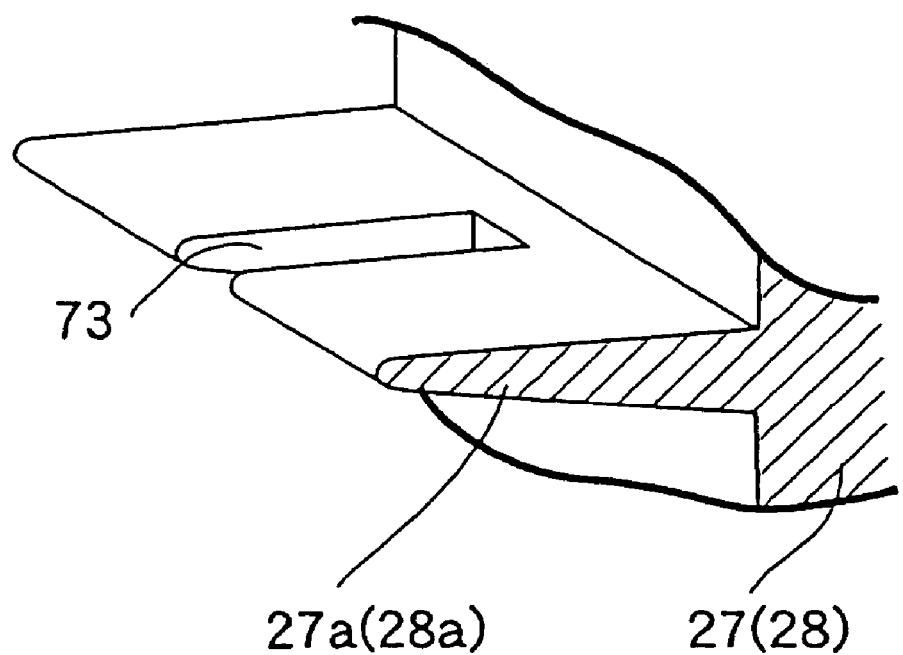
FIG. 8 is a fragmentary enlarged perspective view showing a cooling fin as embodied in another embodiment of the present invention corresponding to the cooling fin shown in FIG. 4.
Figure 9:
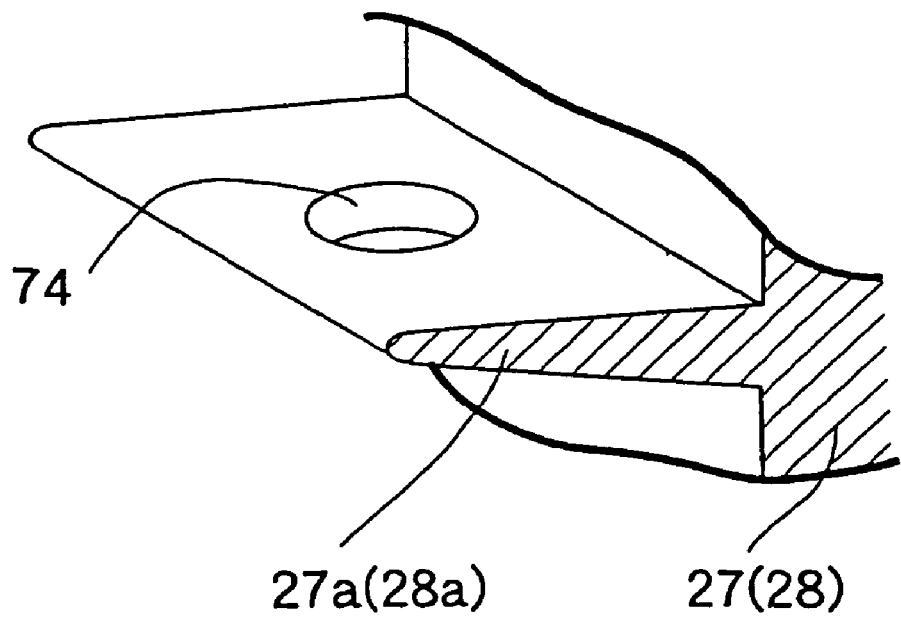
FIG. 9 is a fragmentary enlarged perspective view showing a cooling fin as embodied in still another embodiment of the present invention corresponding to the cooling fin shown in FIG. 4.

As another preferred embodiment according to the present invention, a plurality of cutouts 73 may be provided in the cooling fins 27a, 28a as shown in FIG. 8. As still another preferred embodiment according to the present invention, a plurality of through holes 74 may be provided in the cooling fins 27a, 28a as shown in FIG. 9. In either embodiment, turbulence can be produced in the flow of air flowing near the cooling fins 27a, 28a, which enhances the treatment effects provided by the catalyst layer 58 formed on the cooling fins 27a, 28a.

An air flow passage having an air inflow port and an air outlet port at a front and rear thereof may be formed inside the step floor 17 and inside the rear cover 18 in the body cover 12 and the catalyst layer 58 is formed on the inner surfaces of the step floor 17 and the rear cover 18.

It will be understood that the foregoing description has been made on the specific embodiments of the present invention and that the invention is not limited thereto, but numerous changes in the details of construction may be resorted to without departing from the spirit and the scope of the invention as claimed.

In accordance with the arrangement of the present invention, atmospheric pollutants can be effectively treated even with a vehicle having no radiators and including an engine that is of an air-cooled type because there is little likelihood that the surface of the cooling fins will be contaminated with water or mud. Outstanding treatment effects can thus be achieved at all times.

In accordance with the arrangement of the present invention, since the air flowing through the cooling air passage of the forced-air-cooled engine can be effectively made into contact with an even wider area of the catalyst layer, atmospheric pollutants can be treated even more effectively.

In accordance with the arrangement of the present invention, it is possible to effectively treat atmospheric pollutants by making effective use of a dead space inside the body cover and arranging the catalyst layer to cover a relatively wide area, without changing the appearance of the body cover. In addition, there is little likelihood that the inner surface of the body cover will be contaminated with water or mud. This leads to an outstanding treatment effect offered at all times.

In accordance with the arrangement of the present invention, the arrangement, in which the catalyst layer is disposed in the air cleaner that draws in atmospheric air, forces the catalyst layer into contact with the air flow, thus allowing the atmospheric pollutants to be effectively treated. In addition, there is little likelihood that the inside of the air cleaner will be contaminated with water or mud. This leads to an outstanding treatment effect offered at all times.

In accordance with the arrangement of the present invention, the catalyst layer is disposed to cover a relatively wide area inside the transmission case formed relatively widely so as to cover the belt type continuously variable transmission. The catalyst layer is thus allowed to effectively treat atmospheric pollutants. There is also little likelihood that the inside of the transmission case will be contaminated with water or mud. An outstanding treatment effect can therefore be achieved at all times.

In accordance with the arrangement of the present invention, ozone contained in the atmosphere can be effectively treated and converted to oxygen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An atmospheric pollutant treatment structure comprising:
    a fan for drawing air into a case body of an engine;
    cooling fins for air cooling a cylinder portion of the engine;
    a catalyst layer for treating atmospheric pollutants, said catalyst layer being formed on the cooling fins; and
    a shroud provided with an upper portion cover member and a lower portion cover member connected to each other so as to cover in cooperation with each other the cylinder portion and a part of an engine main body to form a cooling air passage;
    a fan cover covering the fan,
    wherein the upper and lower portion cover members are connected to the fan cover at positions forward of a forward-most part of the fan, and
    wherein a forward-most part of the shroud is attached to the cylinder head, and a rear-most part of the shroud is attached to the fan cover at a position forward of a forward-most part of the fan.

2. The atmospheric pollutant treatment structure according to claim 1, wherein said catalyst layer is formed on at least either an outer surface of a fan fixed to a crankshaft and disposed inside said cooling air passage or an inner surface of said shroud.

3. The atmospheric pollutant treatment structure enabling treatment of pollutants during operation of a vehicle according to claim 2, wherein said pollutants are ozone.

4. The atmospheric pollutant treatment structure enabling treatment of pollutants during operation of a vehicle according to claim 1, wherein said pollutants are ozone.

5. The atmospheric pollutant treatment structure according to claim 1, wherein the shroud is formed with a plurality of curved ribs.

6. The atmospheric pollutant treatment structure according to claim 1, wherein said catalyst layer is formed on one of an outer surface of a fan fixed to a crankshaft and disposed inside said cooling air passage and an inner surface of said shroud.

7. The atmospheric pollutant treatment structure according to claim 1, wherein said catalyst layer is formed on an inner surface of a body cover so as to face an air flow passage.

8. The atmospheric pollutant treatment structure according to claim 1, wherein said catalyst layer is disposed in an air cleaner so as to be exposed to a flow of air flowing through said air cleaner.

9. The atmospheric pollutant treatment structure according to claim 1, wherein said catalyst layer is a manganese compound.

10. The atmospheric pollutant treatment structure according to claim 1, wherein the cooling fins include a plurality of through holes.

11. The atmospheric pollutant treatment structure according to claim 1, wherein the cooling fins include a plurality of cut outs.

12. The atmospheric pollutant treatment structure according to claim 1, wherein a plurality of protrusions are integrally formed with the cooling fins, the protrusions producing turbulence in air flowing near the cooling fins.

13. An atmospheric pollutant treatment structure comprising:
- a fan for drawing air into a case body of an engine;
- cooling fins for air cooling a cylinder portion of the engine; and
- a catalyst layer for treating atmospheric pollutants, said catalyst layer being formed on the cooling fins,
- wherein said cylinder portion and a cylinder head are covered with a shroud, the shroud forming a cooling air passage,
- wherein a forward-most part of the shroud is attached to the cylinder head, and a rear-most part of the shroud is attached to a fan cover at a position forward of a forward-most part of the fan, and
- wherein an ignition plug projects from a side of the cylinder head and into a portion of the cooling air passage adjacent to the fan.

14. An atmospheric pollutant treatment structure comprising:
- a fan for drawing air into a case body of an engine;
- a fan cover covering the fan;
- cooling fins for air cooling a cylinder portion of an engine; and
- a catalyst layer for treating atmospheric pollutants, said catalyst layer being formed on the cooling fins,
- wherein said cylinder portion and a cylinder head are covered with a shroud, the shroud forming a cooling air passage,
- wherein a forward-most part of the shroud is attached to the cylinder head, and a rear-most part of the shroud is attached to the fan cover at a position forward of a forward-most part of the fan, and
- wherein the cooling fins are provided with a plurality of circular-shaped through holes.

15. An atmospheric pollutant treatment structure comprising:
- a fan for drawing air into a case body of an engine;
- cooling fins for air cooling a cylinder portion of the engine; and
- a catalyst layer for treating atmospheric pollutants, said catalyst layer being formed on the cooling fins,
- wherein said cylinder portion and a cylinder head are covered with a shroud, the shroud forming a cooling air passage,
- wherein a forward-most part of the shroud is attached to the cylinder head, and a rear-most part of the shroud is attached to a fan cover at a position forward of a forward-most part of the fan, and
- wherein an ignition plug projects from a side of the cylinder head and into a portion of the cooling air passage adjacent to the fan, and
- wherein edges of the cooling fins are provided with a plurality of cutouts.

\* \* \* \* \*